United States Patent
Abel et al.

(10) Patent No.: US 9,664,093 B2
(45) Date of Patent: May 30, 2017

(54) METHOD FOR CALCULATING EXHAUST TEMPERATURE

(71) Applicant: Caterpillar Inc., Peoria, IL (US)

(72) Inventors: Brandon Abel, Peoria, IL (US); David Pierpont, Dunlap, IL (US); Adwait Joshi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 195 days.

(21) Appl. No.: 14/670,936

(22) Filed: Mar. 27, 2015

(65) Prior Publication Data
US 2016/0281574 A1    Sep. 29, 2016

(51) Int. Cl.
| | |
|---|---|
| G01M 15/10 | (2006.01) |
| F01N 11/00 | (2006.01) |
| F01N 9/00 | (2006.01) |

(52) U.S. Cl.
CPC ............ *F01N 11/005* (2013.01); *F01N 9/005* (2013.01); *F01N 2590/08* (2013.01); *F01N 2900/0404* (2013.01); *F01N 2900/1404* (2013.01); *F01N 2900/1622* (2013.01); *Y02T 10/47* (2013.01)

(58) Field of Classification Search
USPC .......................................... 73/114.69, 114.75
See application file for complete search history.

(56) References Cited

U.S. PATENT DOCUMENTS

| | | | |
|---|---|---|---|
| 7,261,095 B2 | 8/2007 | Kein | |
| 8,078,392 B2 | 12/2011 | Yahata et al. | |
| 8,082,736 B2 | 12/2011 | Mulloy | |
| 9,010,180 B2* | 4/2015 | Petrovic | F02B 47/08 |
| | | | 73/114.69 |
| 2011/0154821 A1* | 6/2011 | Evans-Beauchamp | F02B 39/16 |
| | | | 60/615 |
| 2013/0174547 A1 | 7/2013 | Petrovic et al. | |

FOREIGN PATENT DOCUMENTS

| | | |
|---|---|---|
| DE | 102007012820 A1 | 9/2008 |
| FR | 2821890 A1 | 9/2009 |
| JP | 2008231951 A | 10/2008 |

* cited by examiner

*Primary Examiner* — Eric S McCall
(74) *Attorney, Agent, or Firm* — Baker Hostetler (57) ABSTRACT

A method for calculating exhaust gas temperature indirectly at points in or around an engine exhaust after treatment system for use in determining an amount of unburned hydrocarbons resident therein at a given point in time.

20 Claims, 6 Drawing Sheets

METHOD FOR CALCULATING EXHAUST TEMPERATURE

TECHNICAL FIELD

The present disclosure relates to a method for calculating temperature, and more specifically a way to indirectly calculate an exhaust temperature at points in or around an engine after treatment system for use in determining an amount of unburned hydrocarbons resident therein at a given point in time.

BACKGROUND

Engines such as diesel or other lean burning engines generally provide more complete fuel combustion and better fuel efficiency than other types of engines. While these engines can be very efficient, they generally operate at higher temperatures and pressures than comparable non-lean burning engines. With the higher pressures and temperatures, oxides of nitrogen ($NO_x$) emissions including nitric oxide (NO) and nitrogen dioxide ($NO_2$) are typically higher as oxygen and nitrogen tend to combine more easily at higher temperatures. However, such $NO_x$ emissions have been known to cause environmental issues and thus are subject to emissions control regulations. These emissions control regulations limit the amount of $NO_x$ emissions engines are allowed to emit during normal operation and have resulted in the widespread use of $NO_x$ reduction devices in engine exhaust systems in order to reduce the $NO_x$ emissions to the required levels.

Specifically, one such after treatment system that has been widely used is known as a selective catalytic reduction (SCR) system. SCR systems generally utilize a catalyst that converts $NO_x$ gases into nitrogen gases and water with the aid of a reducing agent. The reducing agent typically contains hydrogen or the like, which is capable of removing oxygen from $NO_x$ gases. Commonly used reducing agents are ammonia, Diesel Exhaust Fluid (DEF), urea, hydrocarbon-containing compounds and the like. The introduction of the reducing agent to the after treatment system allows for it to be adsorbed onto the catalyst to facilitate the reduction process. Typically, a solution of the reducing agent is internally or externally carried by an engine, and a supplying system injects the reducing agent into the exhaust gas stream entering the SCR system.

During engine operations, the unburned hydrocarbons in the exhaust stream enter the SCR system and can adsorb onto the catalyst. The hydrocarbons can be in liquid phase or can condense into the liquid phase upon contacting the catalyst surface. Once in the liquid phase, the hydrocarbons can adsorb and accumulate on the catalyst pores and void volumes. Unburned hydrocarbons are particularly known to be produced in the engine exhaust during pro-longed periods of engine idle usage and/or low temperature operations. If such a situation is followed by relatively rapid heating of the catalyst, the hydrocarbons can ignite and cause an exothermic event that could potentially damage the catalyst. Alternatively, if the accumulated hydrocarbons don't ignite, they can inhibit the catalyst performance by blocking the active catalyst sites used for oxidation of hydrocarbons and carbon monoxide (diesel oxidation catalyst) and conversion of $NO_x$ gases into nitrogen gases and water (selective catalytic reduction).

For this reason, it is desirable to be able to determine the amount of accumulated hydrocarbons that may be trapped in an exhaust after treatment system on a real-time basis so that when levels reach a predetermined level, the issues may be dealt with so that the hyrdocarbons may be released from the after treatment safely and efficiently. Some examples of methods for releasing hydrocarbons include, but are not limited to, manipulating operating/idle conditions, modification of engine calibration/mapping, and limiting engine power output/temperature.

While it would be desired to directly measure the accumulated hydrocarbon level in the after treatment system itself, this can be a difficult characteristic to measure directly. However, it has been found that an accurate model can be utilized to calculate with some accuracy the amount of hydrocarbon build-up. One model that has been used to perform this estimation is Vanadia SCR HC Accumuation Model. One of the inputs needed to utilize this model is the temperature of the exhaust as it enters, or at various points in, the exhaust after treatment system. However, some engine systems do not incorporate a thermocouple or direct measuring sensor located at the points wherein this temperature is needed for the corresponding hydrocarbon accumulation model being used. Accordingly, in order to utilize the aforementioned model (or for any other purpose), it is desirable to have a method for calculating an exhaust temperature entering, or at various points within, the after treatment system utilizing available inputs other than directly measured temperatures.

It is known to calculate engine exhaust temperatures through indirect means, i.e. directly measured and/or calculated inputs other than the temperature itself. For example, U.S. Pat. No. 8,205,606 issued on Jun. 26, 2012 to Rodriguez et al. entitled "Model for inferring temperature of exhaust gas at an exhaust manifold using temperature measured at entrance of a diesel oxidation catalyst" (the '606 patent) discloses one such method. As the title suggests, the '606 patent discloses a method for calculating the temperature of an exhaust gas at an exhaust manifold based upon the temperature measured at the entrance of the exhaust after treatment system. More specifically, the '606 patent discloses calculating this exhaust temperature based upon related parameters including engine operation conditions, ambient conditions, exhaust system characteristics, engine speed and load, etc. However, the '606 patent does not disclose a method for calculating an exhaust temperature at an exhaust after treatment system inlet or at various points therein.

Accordingly, there is a need for a method for calculating an exhaust temperature at the exhaust after treatment inlet or at various points therein utilizing available inputs other than a directly measured temperature.

SUMMARY

In one aspect, the disclosure is directed to a method for calculating an engine exhaust temperature at the exhaust after treatment inlet. More specifically, one aspect of the disclosure provides a method for calculating an exhaust temperature at the exhaust after treatment inlet comprising the steps of: providing the exhaust temperature entering the turbine; calculating the amount of work extracted from the exhaust by a turbo; predicting the temperature for the exhaust flow exiting the turbine; and utilizing a heat transfer model to arrive at a predicted exhaust temperature at the exhaust after treatment system inlet.

In another aspect, the disclosure is directed to a method for calculating an engine exhaust temperature at a catalyst inlet point within an exhaust after treatment system. More specifically, in accordance with this aspect, a method for calculating an exhaust temperature at the catalyst inlet within the after treatment system may comprise the steps of: providing the exhaust temperature entering the turbine, calculating the amount of work extracted from the exhaust by a turbo; predicting the temperature for the exhaust flow exiting the turbine; and utilizing a heat transfer model to replicate heat transfer from the exhaust after treatment inlet to the inlet for the after treatment catalyst to arrive at a predicted exhaust temperature.

In another aspect of the disclosure, a heat transfer model may be used to replicate the engine thermal inertia and applied to the calculated turbine outlet temperature. In another aspect, a low pass filtering model may be applied to the predicted temperature to replicate thermocouple behavior. The temperature predicted according to the disclosure may be used in a strategy that determines an amount of unburned hydrocarbons resident in an after treatment system, and more specifically, in various catalysts utilized in an after treatment system, at a given point in time. Further in accordance with the disclosure, the predicted temperature may be used in a strategy that calculates accumulated urea deposits in an SCR and/or the quantity of ammonia slip from an SCR at any given time. In accordance with the disclosure, the calculated exhaust temperature may be used in an appropriate model to calculate hydrocarbon build-up within the exhaust after treatment system, and more particularly, hydrocarbon build-up within portions of the after treatment catalysts. In exhaust after treatment systems utilizing separate catalyst banks for each cylinder bank, the calculations may be performed separately for each cylinder bank.

DETAILED DESCRIPTION

The present disclosure provides a method for calculating the exhaust temperature at the inlet of an exhaust after treatment system and/or at various points within an exhaust after treatment system including at the inlet to a catalyst bank therein. Further, the present disclosure is related to a method for calculating an amount of hydrocarbon build-up in an exhaust after treatment system utilizing an exhaust temperature calculated in accordance with the foregoing.

Figure 1:
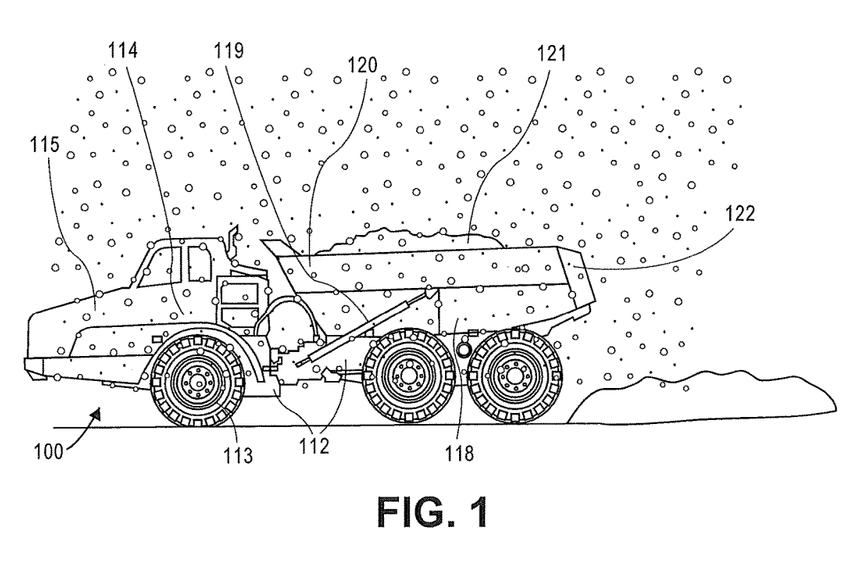
FIG. 1 is an illustration of an exemplary vehicle that utilizes an after treatment system according to aspects of the present disclosure.

In accordance with the disclosure, FIG. 1 is an illustration of an exemplary vehicle 100 incorporating an engine that may utilize an exhaust after treatment system in accordance with aspects of the disclosure. The vehicle 100 may be a wheeled dump truck or any off-highway vehicle being used in any manner or operation. The vehicle 100 is shown to include a chassis 112. The chassis 112 may be supported by wheels 113 (or tracks on other locomotion devices), and itself support an operator cabin 114 and an engine 115. A dump body 118 may be positioned above an actuator system 119, with both being supported by the chassis 112, as well. The actuator system 119 may include one or more hydraulic cylinders (not shown) to raise and lower the dump body 118 at a proximal end 120, for inclining the dump body 118 in order to expel a payload 121 at a distal end 122.

Figure 2:
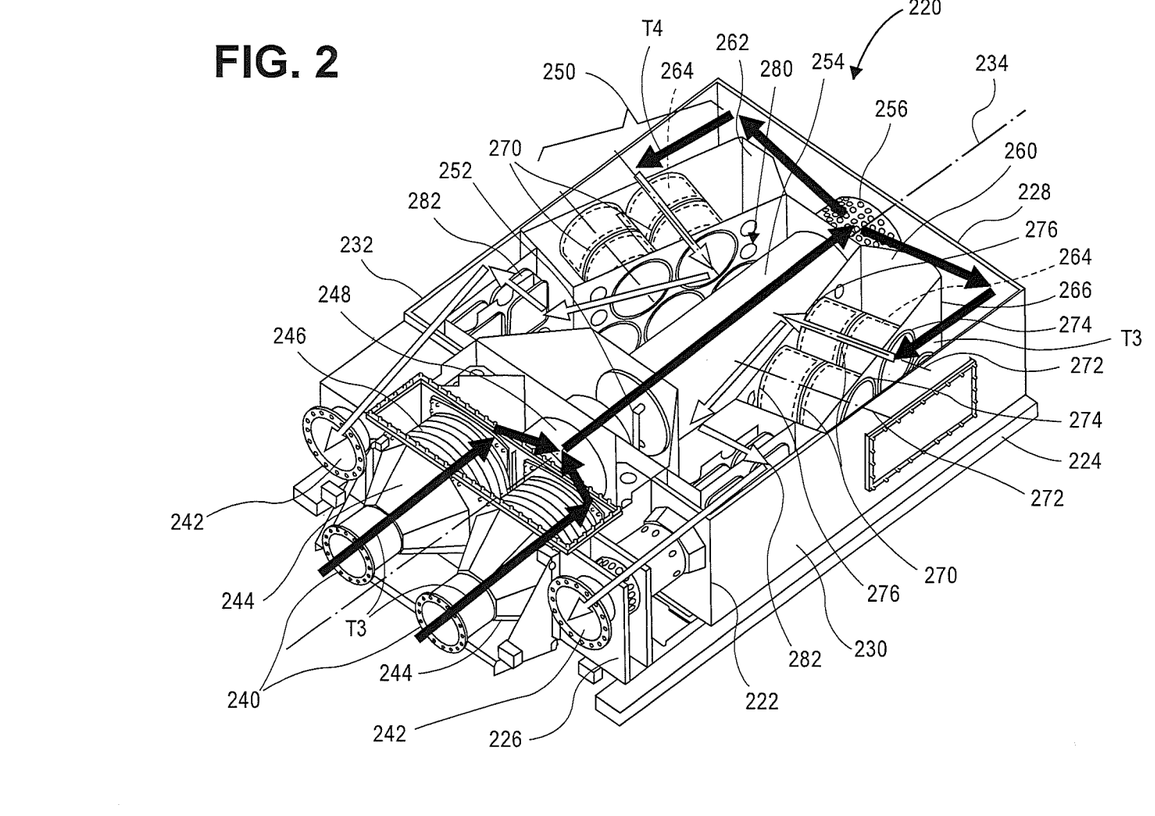
FIG. 2 is a perspective view of an exemplary after treatment system that may be used in accordance with aspects of the present disclosure.

FIG. 2 is a perspective view of an exhaust after treatment system 220 with the top removed to illustrate the components and the corresponding exhaust flow. The exhaust after treatment system 220 can include a housing 222 that is supported on a base support 224 adapted to mount the exhaust after treatment system 220 to an engine, such as a diesel engine 115 of the vehicle 100. The housing 222 can include a forward first wall 226, an opposing rearward second wall 228, and respective third and fourth sidewalls 230, 232. However, it should be appreciated that terms like forward, rearward and side are used only for illustrative purposes and should not be construed as a limitation on the claims. Additionally, extending between the forward first wall 226 and rearward second wall 228 and located midway between the third and fourth sidewalls 230, 232 can be an imaginary central system axis line 234.

To receive the untreated engine 115 exhaust gasses into the exhaust after treatment system 220, one or more inlets 240 can be disposed through the forward first wall 226 of the housing 222 and can be coupled in fluid communication to the exhaust channel from an exhaust system. In the embodiment illustrated, the after treatment system 220 may include two inlets 240, corresponding to separate cylinder banks within the engine 115, arranged generally in parallel and centrally located between the third and fourth sidewalls 230, 232 on either side of the system axis line 234 so that the entering exhaust gasses are directed toward the rearward second wall 228. It is to be understood that while FIG. 2 depicts an exhaust after treatment system 220 wherein the exhaust streams from both inlets 240 are mixed within the after treatment system 220. However, it is within the scope of the disclosure to provide separate inlets 240 corresponding to separate engine 115 cylinder banks and wherein the exhaust flow therefrom may remain separated while being treated within the exhaust after treatment system 220.

In accordance with the disclosure, two outlets 242 may be disposed through the forward first wall 226 of the housing 222 to enable the exhaust gasses to exit the after treatment system 220. Each outlet 242 may be oriented in a parallel fashion to the centrally oriented inlets 240.

To treat or condition the exhaust gasses, the housing 222 may contain various types or kinds of after treatment devices through which the gasses of the exhaust flow are directed. For example, and following the arrows indicating exhaust flow through the after treatment system 220, in order to slow the velocity of the incoming exhaust gasses for treatment, the inlets 240 can each be communicatively associated with an expanding, cone-shaped diffuser 244 mounted exteriorly of the forward first wall 226. Each cone-shaped diffuser 244 can direct the exhaust gasses to an associated diesel oxidation catalyst (DOC) 246 located proximate the forward first wall 226 inside the housing 222 that then directs the exhaust gasses to a common collector duct 248 centrally aligned along the system axis line 234. The DOC 246 can contain materials such as platinum group metals like platinum or palladium, which can catalyze carbon monoxide and hydrocarbons in the exhaust gasses to water and carbon dioxide via the following possible reactions:

$$CO + \tfrac{1}{2}O_2 = CO_2 \qquad (1)$$

$$[HC] + O_2 = CO_2 + H_2O \qquad (2)$$

To further reduce emissions in the exhaust gasses and particularly to reduce nitrogen oxides such as NO and $NO_2$, sometimes referred to as $NO_X$, the after treatment system 220 may include an SCR system 250. In the SCR process, a liquid or gaseous reducing agent is introduced to the exhaust system and directed through an SCR catalyst along with the exhaust gasses. The SCR catalyst can include materials that cause the exhaust gasses to react with the reducing agent to convert the $NO_X$ to nitrogen ($N_2$) and water ($H_2O$). A common reducing agent is urea (($NH_2)_2CO$), though other suitable substances such as ammonia ($NH_3$), Diesel Exhaust Fluid (DEF) can be used in the SCR process. The reaction may occur according to the following general formula:

$$NH_3 + NO_X = N_2 + H_2O \qquad (3)$$

Referring again to FIG. 2, to introduce the reducing agent, the SCR system 250 may include a reductant injector 252 located downstream of the collector duct 248 and upstream of a centrally aligned mixing duct 254 that channels the exhaust gasses toward the rearward second wall 228 of the housing 222. The reductant injector 252 can be in fluid communication with a storage tank or reservoir storing the reducing agent and can periodically, or continuously, inject a quantity of the reducing agent into the exhaust gas flow in a process sometimes referred to as dosing. The amount of reducing agent introduced can be dependent upon the $NO_X$ load of the exhaust gasses. The mixing duct 254 uniformly intermixes the reductant agent with the exhaust gasses before they enter the downstream SCR catalysts. Disposed at the end of the mixing duct 254 proximate the rearward second wall 228 can be a diffuser 256 that redirects the exhaust gas/reductant agent mixture toward the third and fourth sidewalls 230, 232 of the after treatment system 220. The third and fourth sidewalls 230, 232 can redirect the exhaust gas/reductant agent mixture generally back towards the forward first wall 226.

To perform the SCR reaction process, the exhaust after treatment system 220 can include a first SCR module 260 disposed proximate the third sidewall 230 and a second SCR module 262 disposed toward the fourth sidewall 232. The first and second SCR modules 260, 262 may be oriented to receive the redirected exhaust gas/reducing agent mixture. The first and second SCR modules 260, 262 can accommodate one or more SCR catalysts 264, sometimes referred to as after treatment bricks. The term after treatment brick, however, may refer to a variety of exhaust after treatment devices, which SCR catalysts are a subset of. Moreover, in different aspects, the SCR modules 260, 262 may be configured to accommodate any different number of after treatment bricks that may be in different shapes, sizes and/or configurations and that may operate by the same or different reaction processes.

To accommodate the plurality of SCR catalysts 264, the first and second SCR modules 260, 262 can include one or more sleeves 270 that can slidably receive the catalysts. The sleeves 270 can be generally elongated, tubular structures having a first end 274 and an opposing second end 276 aligned along a longitudinal sleeve axis 272. In some aspects, the first end 274 may be designated as an upstream end and the second end 276 may be designated as the downstream end thereby establishing the gas flow direction through the sleeves 270. In other aspects, the flow direction through the first and second SCR modules 260, 262 may be at least partially reversible so that either the first end or second end 274, 276 may function alternatively as the upstream or downstream ends. In those aspects that include more than one sleeve 270 in the first and second SCR modules 260, 262, the sleeves can be supported in a truss or frame 266 made, for example, from formed sheet metal or cast materials. The frame 266 can be oriented so that the first ends 274 are directed toward the respective third and fourth sidewalls 230, 232 and the second ends 276 communicate with a central region 280 of the after treatment system 220 generally surrounding but fluidly separated from the mixing duct 254. The central region 280 can direct the treated exhaust gases forward to the outlets 242 disposed through the forward first wall 226. In various aspects, one or more additional exhaust treatment devices can be disposed in the after treatment system 220 such as diesel particulate filters 282 for removing soot.

In one aspect of the disclosure, such as in a cold environment, the vehicle 100 may be left in idle for an extended period of time, such as overnight. During such extended low temperature operation, hydrocarbons may accumulate on the catalysts (including in the DOCs 246 and the SCRs 250) in the exhaust after treatment system 220. As discussed herein, the accumulation of hydrocarbons can be deleterious in that when the vehicle 100 is thereafter operated, an undesirable exothermic reaction may be induced in the after treatment system thereby, potentially, damaging the catalysts in the DOCs 246 and SCRs 250 and other parts of the after treatment system 220.

Figure 3:
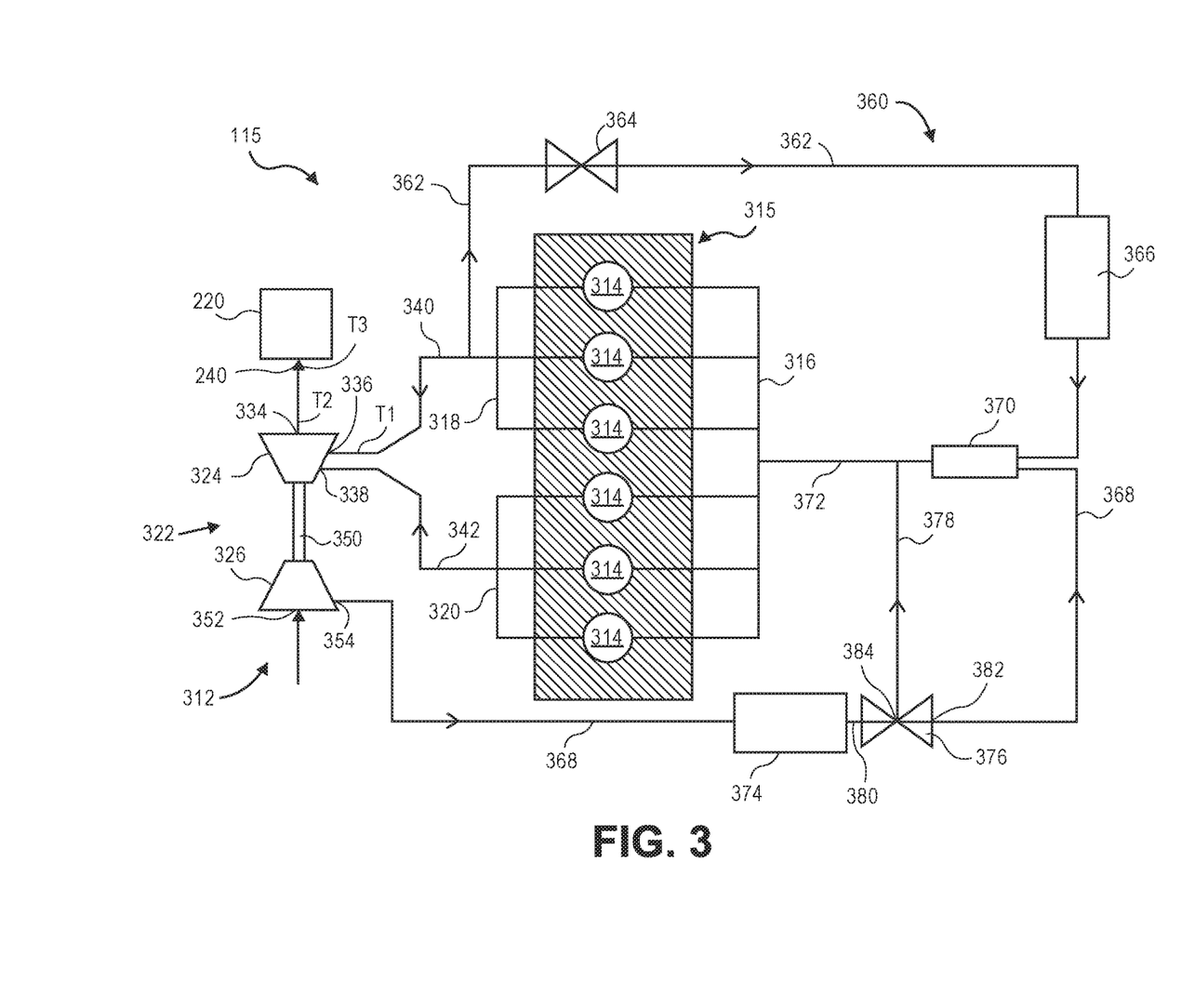
FIG. 3 is a schematic diagram of components of an internal combustion engine in accordance with aspects of the present disclosure.

FIG. 3 is a schematic drawing of a single cylinder bank 315 of an internal combustion engine 115 having a turbocharger system 312 and exhaust after treatment system 220 in accordance with aspects of the disclosure. It is to be understood that systems may be utilized having multiple cylinder banks 315 as is known in the art but for clarity sake, only a single cylinder bank 315 is shown herein.

In accordance with this disclosure, internal combustion engine 115 may have a cylinder bank 315 comprise of a plurality of combustion cylinders 314. Each combustion cylinder 314 may be coupled with a corresponding intake manifold 316 and with a corresponding exhaust manifold 318, 320. While a single intake manifold 316 is shown, it should be understood that more than one intake manifold may be used with or coupled to each combustion cylinder 314, for providing an air mixture to each combustion cylinder 314. A fuel, such as diesel fuel is injected into each combustion cylinder 314 and combusted therein, in a known manner.

Internal combustion engine 115 may include a first exhaust manifold 318 and a second exhaust manifold 320. First exhaust manifold 318 may be fluidly coupled with three of the combustion cylinders 314, and second exhaust manifold 320 may be fluidly coupled with the remaining three combustion cylinders 314. Turbocharger system 312 may include a turbocharger 322 having a turbine 324 and a compressor 326. Turbine 324 may have a turbine outlet 334 leading to an inlet 240 to the exhaust after treatment system 220, a first inlet path 336 in fluid flow communication with first exhaust manifold 318 and a second inlet path 338 in fluid flow communication with second exhaust manifold 320. A fluid conduit 340 connects first exhaust manifold 318 to first inlet path 336, and a fluid conduit 342 fluidly connects second exhaust manifold 320 to second inlet path 338. A turbine wheel (not shown) may be disposed on a shaft 350 drivingly coupled to a compressor wheel (not shown) in compressor 326. A compressor inlet 352 and a compressor outlet 354 may be provided for compressor 326. Compressor inlet 352 receives combustion gas from a source such as ambient air, and compressor outlet 354 supplies compressed combustion gas to intake manifold 316.

In accordance with some aspects of the disclosure, the engine system may be equipped with an exhaust gas recirculation (EGR) system 360 as is known in the art. Such a system may include a duct 362 receiving exhaust gas from first exhaust manifold 318, to direct the exhaust gas to intake manifold 316. Duct 362 is connected to conduit 340 in fluid flow communication, and includes a valve 364 for controlling the flow of exhaust gas through duct 362. A cooler 366 may be provided in duct 362 to lower the temperature of exhaust gas provided to intake manifold 316. A fluid conduit 368 fluidly couples compressor outlet 354 to a mixer 370. Mixer 370 also receives exhaust gas flow from duct 362, and controls the mixture of compressed combustion gas from compressor 326 with exhaust gas recirculated from exhaust gas recirculation system 360, and provides the mixture thereof to intake manifold 316 through a fluid conduit 372.

An optional aftercooler 374 may be provided in fluid conduit 368, and a valve 376 in conduit 368 may direct compressed gas flow to mixer 370 or through a fluid conduit 378 directly to fluid conduit 372, thereby bypassing mixer 370. Valve 376 may include an inlet 380 connected in fluid flow communication to conduit 368, and receives compressed combustion gas from compressor 326. Valve 376 may further include a first outlet 382 connected to conduit 368, for directing compressed combustion gas flow towards mixer 370, and a second outlet 384 connected in fluid flow communication to fluid conduit 378.

During use of engine 115, a fuel, such as diesel fuel, is injected into combustion cylinders 314 and combusted when a piston (not shown) disposed within each combustion cylinder 314 is at or near a top dead center position. Exhaust gas is transported from each combustion cylinder 314 to the exhaust manifold associated with it, either first exhaust manifold 318 or second exhaust manifold 320. Exhaust gas within first exhaust manifold 318 is transported to first inlet path 336 and exhaust gas from second exhaust manifold 320 is transported to second inlet path 338, for rotatably driving turbine wheel (not shown). Turbine 324 in turn rotatably drives compressor 326 via shaft 50. The spent exhaust gas is discharged from turbine 324 to the after treatment system 220 through turbine outlet 334.

Exhaust gas is recirculated from first exhaust manifold 318 to intake manifold 316 via EGR duct 362, mixer 370 and fluid conduit 372. Compressor 326 draws combustion air into compressor inlet 352. The combustion air is compressed within compressor 326 and is discharged from compressor 326 through compressor outlet 354 and fluid conduit 368. The compressed combustion air is cooled within aftercooler 374 and is transported to intake manifold 316 via mixer 370 and fluid conduit 372 for use in combustion occurring within combustion cylinders 314. Mixer 370 combines fluid flow from EGR duct 362 and from fluid conduit 368, and supplies the mixture thereof to intake manifold 316 through fluid conduit 372. Valve 376 may be operated to bypass some or all of the compressed gas flow in conduit 368 to conduit 372 and intake manifold 316, bypassing mixer 370. EGR flow rate in duct 362 may be controlled by valve 364.

Figure 4:
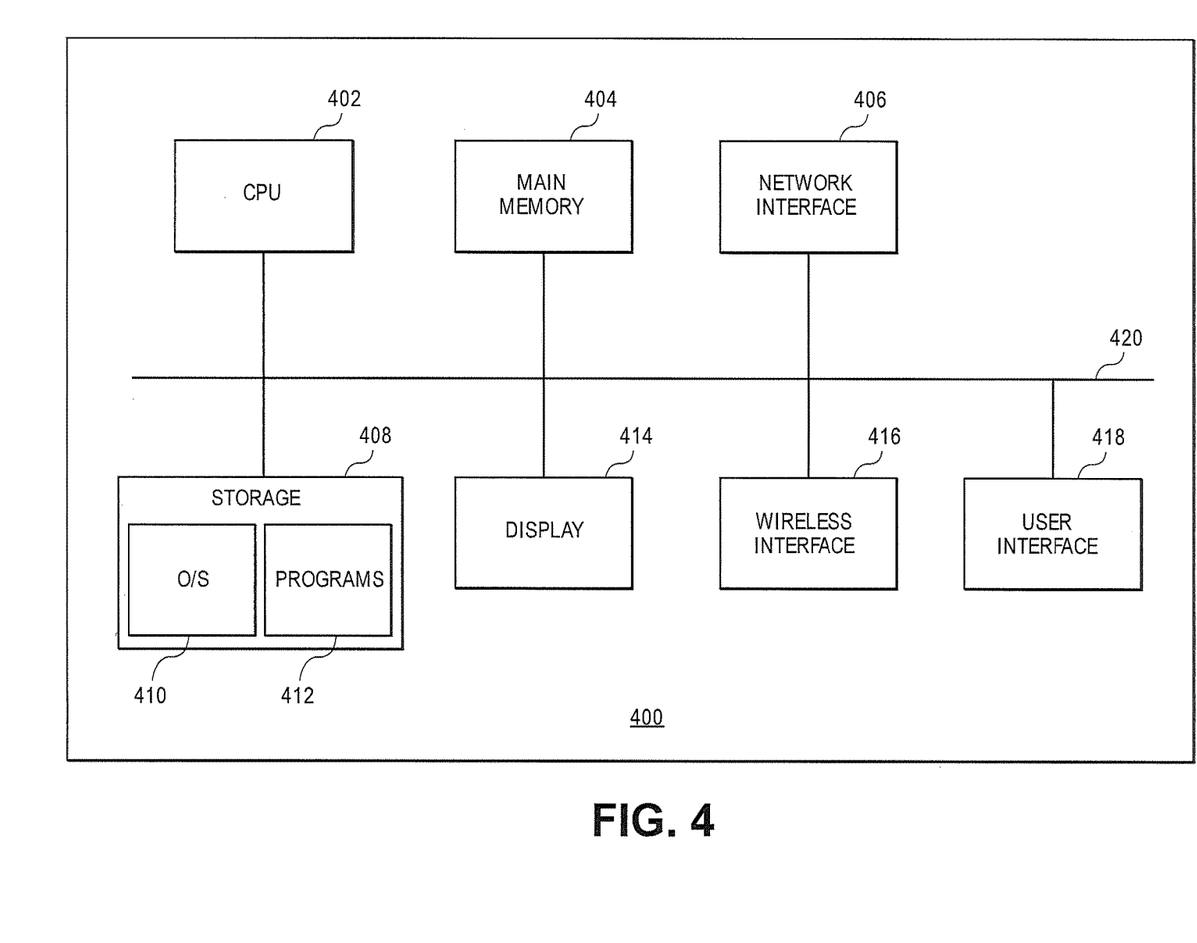
FIG. 4 is a schematic diagram of components of an engine system computer suitable for use in accordance with aspects of the present disclosure.

FIG. 4 illustrates components of an engine system computer 400 according to the disclosure. The engine system computer 400 can include a microprocessor 402, a main memory 404, a network interface 406, a storage device 408, a display 414, a wireless interface 416, a user interface 418 and bus line 420. The microprocessor 402 may be a single microprocessor or multiple microprocessors, multiple core microprocessors, a field programmable gate array (FPGA), application-specific integrated circuit (ASIC), controllers and the like. It is contemplated that microprocessor 402 may communicate with other machine sensors (not shown), such as gas sensors, $NO_x$ sensors, $NH_3$ sensors, throttle position sensors, mass flow, rate sensors, pressure sensors, temperature sensors, intake manifold sensors, throttle position sensors, and/or any other system sensors that may provide information related to the operational characteristics of the engine.

Main memory 404 may contain certain software needed for the microprocessor 402, such as the bios and the like. In addition to or alternatively, there is a storage device 408 that includes an operating system 410 for the engine system computer 400 and programs 412, such as software programs (discussed herein) to protect the after treatment system 220 from the effects of hydrocarbon accumulation. The storage device 408 may be a hard drive, optical drive, a flash memory and the like. The operating system 410 can be any system such as Windows®, Mac O/S®, Linux, Android® and the like. Storage device 408 can also store one or more multi-dimensional maps.

It is to be understood that multi-dimensional maps, models or equations disclosed herein and utilized in accordance with the disclosure may be generated from steady-state simulations and/or empirical data and may include equations, graphs and/or tables related to the operational characteristics of after treatment system and other information including hydrocarbon accumulation as is known in the art. For example, maps may include equations, graphs and/or tables that relate to a DOC and/or SCR device temperature (either measured or predicted) to an ability of SCR device to store reducing agent and to convert emissions gases. The inputs fed into the maps may include engine air mass flow rate, manifold correction factor, inlet gas ratio, inlet $NO_2$ over $NO_x$ ratio, inlet pressure, and inlet temperature of SCR device, inlet temperature of DOC device, ambient temperature, a total fuel quantity, engine speed, etc. It is contemplated that maps may further include other formulations and weighting and may include further inputs, such as, a space velocity and the like.

A display 414 can be provided and be placed at any convenient place in the vehicle 100 including a heads up display (HUD), a built-in display on the console of the vehicle, a remote and movable display and the like. The display 414 can be LED, VGA, OLED, plasma, touch screen and the like. Network interface 406 can connect the engine system computer 400 to other devices, such as a diagnostic tool, the after treatment system 220, reductant injector 252, sensors, electronic control modules, and the like. The network interface 406 can be USB, Fire wire, Thunderbolt, Ethernet, and the like. The wireless interface 416 can communicate with external devices, sensors, electronic control modules, networks, computers, diagnostic tools, tablets, and the like via various communication protocols, such as Wi-Fi, LAN, WAN, Bluetooth, wireless Ethernet, infrared, cellular, satellite and the like. A user interface 418 allows a user or an operator to interact with the engine system computer 400. The user interface 418 may be the touch-screen display 414. The components of the engine system computer may communicate with each other on the bus line 420.

Figure 5:
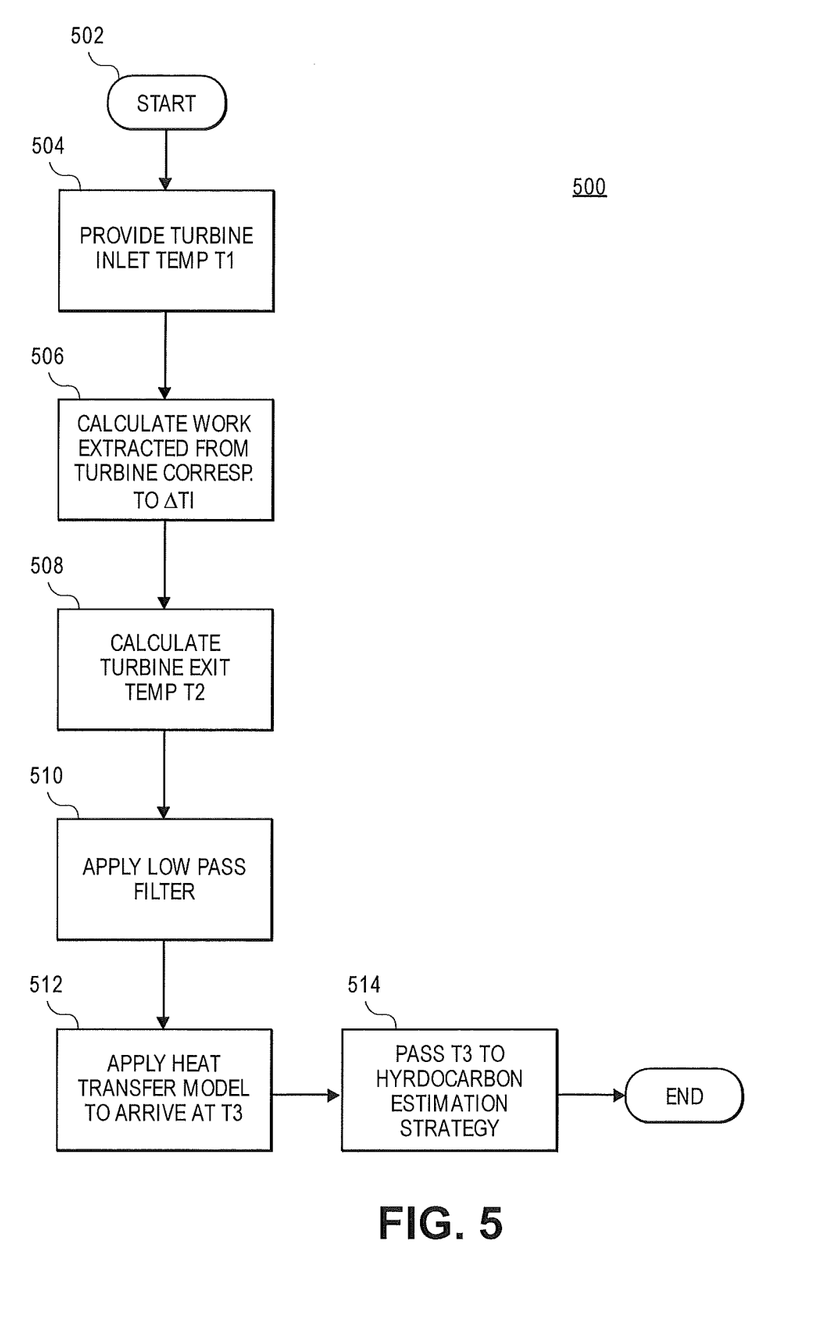
FIG. 5 is a flow diagram of a method for calculating an exhaust temperature at the inlet to an exhaust after treatment system in accordance with aspects of the present disclosure.

FIG. 5 is a flow diagram 500 of steps to calculate an inlet temperature for exhaust gases entering after treatment system 220 and utilizing the same in a hydrocarbon estimation strategy. The calculation starts at step 502. At step 504, the exhaust temperature T1 entering the turbine 324 is either provided as an observed number from an associated sensor or calculated from various engine system parameters received from various electronic control modules of the vehicle 100. The system parameters may be received at the microprocessor 402, which may be running after treatment protection software.

At step 506, the amount of work extracted from the exhaust by the turbine 324 may be calculated by a physics-based energy balance equation as is known in the art. For this calculation, engine system parameters may include the amount of fuel being injected into the engine, the engine speed (average speed or current speed), the engine timing or idle rotation per minute, the total mass exhaust flow, the crank mode, inject enable, inlet manifold pressure or temperature, coolant temperature, ambient temperature and pressure, and other parameters. Using that calculation, a ΔT1 may be calculated in a known manner.

At step 508 the predicted temperature for the exhaust flow exiting the turbine 324 may be calculated by subtracting the ΔT1 temperature from the exhaust temperature T1 prior to the turbine 324 to arrive at a T2.

At step 510 a low pass filtering model may be applied to the T2 temperature. This low pass filtering model may be used to replicate the behavior of a thermocouple and/or provide a correction factor to correct for thermal inertia of the engine 115 "iron." With respect to the thermal inertia correction, the calculated turbine 324 outlet exhaust temperature T2 represents an instantaneous value which generally needs to be corrected for residual heat added to or removed from the exhaust gas as it flows through the engine 115. In accordance with the disclosure, this correction for residual heat transfer in the engine 115 may be managed through filtering of the output signal.

At step 512 a heat transfer model may be applied to calculate a ΔT2 from the turbine 324 outlet to the exhaust after treatment system 220 inlets 240. In the present disclosure, given the location of the inlets 240 to the DOCs 270, this temperature is essentially the temperature of the exhaust gas at the DOCs 270. The ΔT2 may be subtracted from the T2 temperature to arrive at a T3 temperature prior to the exhaust entering the DOCs 270 (see FIG. 2).

At step 514 the calculated T3 temperature may be passed to the hydrocarbon estimation model or strategy to determine the estimated amount of hydrocarbon build-up in the DOCs 270.

In accordance with one aspect of the disclosure, separate inlet temperatures T3 for each inlet 240 leading to the after treatment system 220 from each cylinder 314 bank may be calculated separately. Such a strategy is useful in engine 115 systems utilizing multiple cylinder 314 banks because each cylinder 314 bank utilizes separate DOC's 270, respectively, and may accumulate hydrocarbons at different rates and thus the risk of exothermic events, damage are DOC 270 specific.

Figure 6:
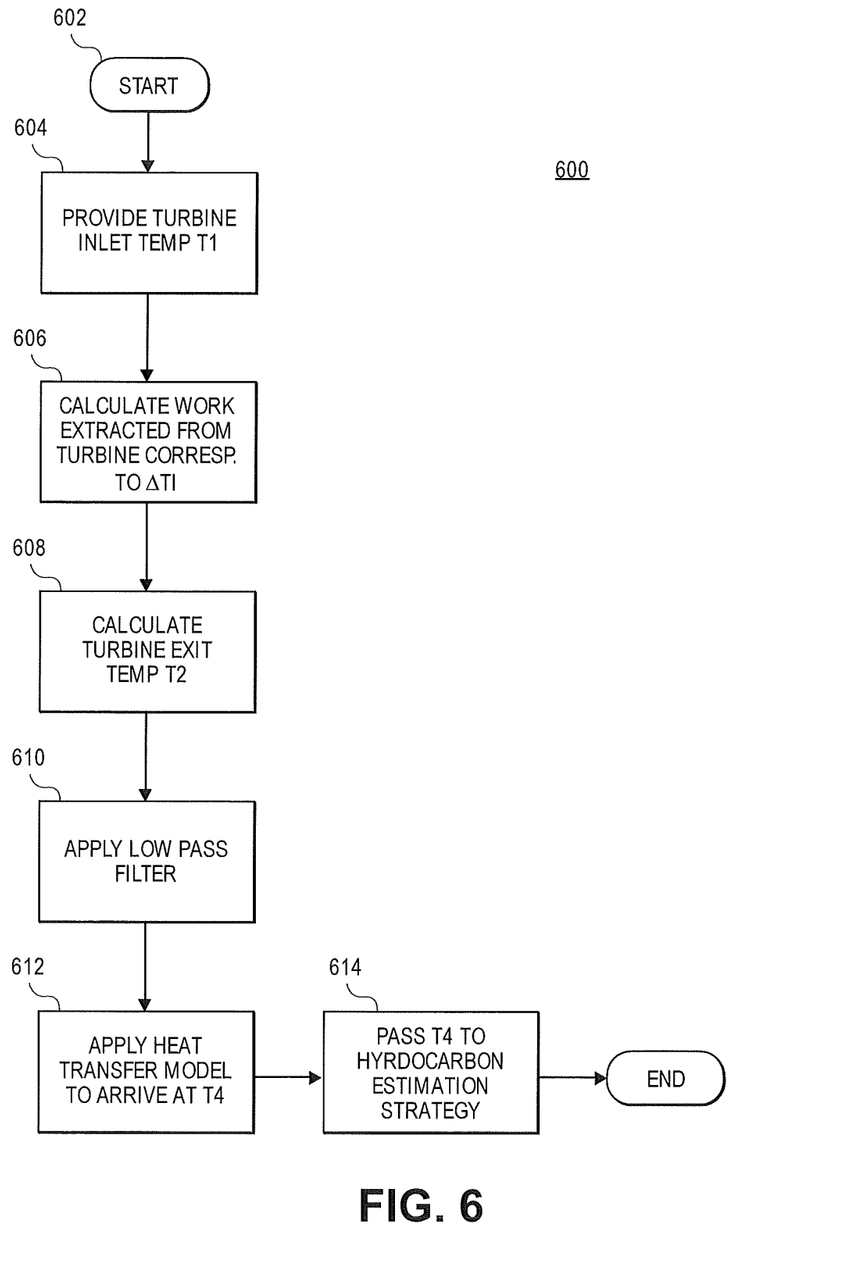
FIG. 6 is a flow diagram of a method for calculating an exhaust temperature at the inlet to a catalyst bank of an exhaust after treatment system in accordance with aspects of the present disclosure.

FIG. 6 is a flow diagram 600 of steps to calculate an inlet temperature for exhaust gases entering an SCR catalyst 250 bank of an after treatment system 220 and utilizing the same in a hydrocarbon estimation strategy. The calculation starts at step 602.

At step 604, the exhaust temperature T1 entering the turbine 324 is either provided as an observed number from an associated sensor or calculated from various engine system parameters received from various electronic control modules of the vehicle 100. The system parameters may be received at the microprocessor 402, which may be running after treatment protection software.

At step 606, the amount of work extracted from the exhaust by the turbine 324 may be calculated by a physics-based energy balance equation as is known in the art. For this calculation, engine system parameters may include the amount of fuel being injected into the engine, the engine speed (average speed or current speed), the engine timing or idle rotation per minute, the total mass exhaust flow, the crank mode, inject enable, inlet manifold pressure or temperature, coolant temperature, ambient temperature and pressure, and other parameters. Using that calculation, a ΔT1 may be calculated in a known manner.

At step 608 the predicted temperature for the exhaust flow exiting the turbine 324 may be calculated by subtracting the ΔT1 temperature from the exhaust temperature T1 prior to the turbine 324 to arrive at a T2.

At step 610 a low pass filtering model may be applied to the T2 temperature. This low pass filtering model may be used to replicate the behavior of a thermocouple and/or provide a correction factor to correct for thermal inertia of the engine 115 "iron." With respect to the thermal inertia correction, the calculated turbine 324 outlet exhaust temperature T2 represents an instantaneous value which generally needs to be corrected for residual heat added to or removed from the exhaust gas as it flows through the engine 115. In accordance with the disclosure, this correction for residual heat transfer in the engine 115 may be managed through filtering of the output signal.

At step 612 a heat transfer model may be applied to calculate a ΔT2 from the turbine 324 outlet to the SCR 250 inlets. The ΔT2 may be subtracted from the T2 temperature to arrive at a T4 temperature prior to the exhaust entering the SCRs 250 (see FIG. 2).

At step 614 the calculated T4 temperature may be passed to the hydrocarbon estimation model or strategy to determine the estimated amount of hydrocarbon build-up in the SCRs 250. Further in accordance with another aspect of the disclosure, the calculated T4 temperature may be used in a strategy that calculates accumulated urea deposits in the SCRs 250 and/or the quantity of ammonia slip from the SCRs 250 at any given time.

In accordance with one aspect of the disclosure, separate inlet temperatures T4 for the inlet to each SCR 250 from each cylinder 314 bank may be calculated separately. Such a strategy is useful in engine 115 systems utilizing multiple cylinder 314 banks and wherein the exhaust gases remain segregated in the after treatment system 220 because each SCR 250 may accumulate hydrocarbons at different rates and thus the risk of exothermic events, damage are SCR 250 specific.

The steps outlined in FIGS. 5 and 6 may be performed automatically via software, processor, and electronic control modules without operator intervention or direction. Additionally, the processes and systems described herein are constantly and automatically estimating, calculating, adjusting, modulating, etc., due to different operating parameters of the engine system.

The present disclosure can be realized as computer-executable instructions on computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present disclosure can include the computer-readable medium having stored thereon a data structure including a plurality of fields containing data representing the techniques of the present disclosure.

The foregoing strategies assume valid turbocharger speed, turbine inlet temperature and mass flow measurements exist for each bank. Within the scope of the disclosure, it should be understood that these, and other, parameters may be directly measured or may be determined through calculations, modeling, etc. as is known in the art. In the event one of these required parameters is not available, the model is capable of being trained with empirical engine data, which can provide lesser but acceptable accuracy in a faulted condition. Also, because compressor maps are historically poor at low speeds and pressure ratios the model is capable of utilizing an empirical data mode as required for more accurate estimation as required to maintain accuracy of the predictions.

INDUSTRIAL APPLICABILITY

The disclosure is applicable to any engine systems having exhaust after treatment systems wherein it would be desirable to calculate a temperature of the exhaust either entering, or within, the exhaust after treatment system. Such engine systems particularly include after treatment systems having a catalyst therein that may need protection from the effects of hydrocarbon accumulation and wherein such a temperature may be necessary in the calculation of such hydrocarbon build-up. More specifically, the present disclosure is particularly useful in applications where it may be expensive and/or difficult to provide a thermocouple or other sensor to directly measure exhaust temperatures at the inlet to an exhaust after treatment system (or at various points therein).

Although specific exemplary aspects of the disclosure have been described, internal and external components and configurations may be implemented in reverse to provide the same benefits provided by the inventive aspects described. In addition, it will be appreciated by one skilled in the art that other related items can be incorporated and used along with aspects derived from the disclosure.

The many features and advantages of the disclosure are apparent from the detailed specification, and thus, it is intended by the appended claims to case all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

We claim:
1. A method of calculating an inlet temperature for exhaust gases entering a catalyst module in an exhaust gas after treatment system, comprising the steps of:
receiving, at a microprocessor of an engine system, an exhaust temperature of an exhaust gas prior to the exhaust gas entering a turbine of an internal combustion engine system;
calculating, with the microprocessor, an amount of work extracted from the turbine utilizing parameters received by the microprocessor from a plurality of electronic control modules of the engine system;
calculating, with the microprocessor, a first predicted temperature of the exhaust gases based upon the amount of work extracted by the turbine;
utilizing, with the microprocessor, a low pass filtering model to arrive at a second predicted temperature of the exhaust gas;
calculating, with the microprocessor, a third predicted temperature of the exhaust gas using a heat transfer model.

2. The method of claim 1 further comprising the step of utilizing the third predicted temperature to calculate a predicted amount of hydrocarbon build-up in a catalyst module of an exhaust gas after treatment system of the engine system.

3. The method of claim 1 further comprising the step of utilizing the third predicted temperature to calculate accumulated urea deposits in a selective catalytic reduction module of an exhaust gas after treatment system of the engine system.

4. The method of claim 1 further comprising the step of utilizing the third predicted temperature to calculate the quantity of ammonia slip from a selective catalytic reduction module of an exhaust gas after treatment system of the engine system.

5. The method of claim 2 wherein the catalyst module is a diesel oxidation catalyst module.

6. The method of claim 2 wherein the catalyst module is a selective catalytic reduction module.

7. The method of claim 1 wherein the low pass filtering model replicates the behavior of a thermocouple.

8. The method of claim 1 wherein the low pass filtering model provides a correction factor to correct for thermal inertia of the engine.

9. The method of claim 1 wherein the low pass filtering model replicates the behavior of a thermocouple and provides a correction factor to correct for thermal inertia of the engine.

10. The method of claim 1 wherein the engine system comprises multiple cylinder banks and the third predicted temperature corresponds to the predicted exhaust temperature from a single cylinder bank.

11. A method of calculating an inlet temperature for exhaust gases entering a catalyst module in an exhaust gas after treatment system, comprising the steps of:

receiving, at a microprocessor of an engine system, an exhaust temperature of an exhaust gas prior to the exhaust gas entering a turbine of an internal combustion engine system;

calculating, with the microprocessor, an amount of work extracted from the turbine utilizing parameters received by the microprocessor from a plurality of electronic control modules of the engine system;

calculating, with the microprocessor, a first predicted temperature of the exhaust gases based upon the amount of work extracted by the turbine;

utilizing, with the microprocessor, a low pass filtering model to arrive at a second predicted temperature of the exhaust gas;

calculating, with the microprocessor, a third predicted temperature of the exhaust gas using a heat transfer model;

utilizing the third predicted temperature to calculate a predicted amount of hydrocarbon build-up in a catalyst module of an exhaust gas after treatment system of the engine system.

12. The method of claim 11 wherein the catalyst module is a diesel oxidation catalyst module.

13. The method of claim 11 wherein the catalyst module is a selective catalytic reduction module.

14. The method of claim 11 wherein the low pass filtering model provides a correction factor to correct for thermal inertia of the engine.

15. A method for preventing excess hydrocarbon build-up in a catalyst module in an exhaust gas after treatment system for a combustion engine, comprising the steps of:

receiving, at a microprocessor of an engine system, an exhaust temperature of an exhaust gas prior to the exhaust gas entering a turbine of an internal combustion engine system;

calculating, with the microprocessor, an amount of work extracted from the turbine utilizing parameters received by the microprocessor from a plurality of electronic control modules of the engine system;

calculating, with the microprocessor, a first predicted temperature of the exhaust gases based upon the amount of work extracted by the turbine;

utilizing, with the microprocessor, a low pass filtering model to arrive at a second predicted temperature of the exhaust gas;

calculating, with the microprocessor, a third predicted temperature of the exhaust gas using a heat transfer model;

utilizing the third predicted temperature to calculate a predicted amount of hydrocarbon build-up in a catalyst module of an exhaust gas after treatment system of the engine system;

manipulating, with the microprocessor, an operating condition of the engine system in order to lessen hydrocarbon build-up in the catalyst module.

16. The method of claim 15 wherein the step of manipulating the operating condition of the engine system includes modifying the operating or idle conditions of the engine system.

17. The method of claim 15 wherein the step of manipulating the operating condition of the engine system includes modifying the engine system calibration or mapping.

18. The method of claim 15 wherein the step of manipulating the operating condition of the engine system includes limiting engine system power output or temperature.

19. The method of claim 15 wherein the catalyst module is a diesel oxidation catalyst module.

20. The method of claim 15 wherein the low pass filtering model provides a correction factor to correct for thermal inertia of the engine.

* * * * *